US 11,747,288 B2

(12) United States Patent
Nagano et al.

(10) Patent No.: US 11,747,288 B2
(45) Date of Patent: Sep. 5, 2023

(54) NON-DESTRUCTIVE INSPECTION SYSTEM COMPRISING NEUTRON RADIATION SOURCE AND NEUTRON RADIATION METHOD

(71) Applicants: Topcon Corporation, Tokyo (JP); RIKEN, Saitama (JP)

(72) Inventors: Shigenori Nagano, Saitama (JP); Hisashi Tsukada, Hachiouji (JP); Yoshie Otake, Wako (JP); Koji Ikado, Wako (JP); Yuichi Yoshimura, Wako (JP); Hideyuki Sunaga, Wako (JP)

(73) Assignees: Topcon Corporation, Tokyo (JP); RIKEN, Saitama (JP)

( * ) Notice: Subject to any disclaimer, the term of this patent is extended or adjusted under 35 U.S.C. 154(b) by 129 days.

(21) Appl. No.: 17/279,537

(22) PCT Filed: Sep. 25, 2019

(86) PCT No.: PCT/JP2019/037500
§ 371 (c)(1),
(2) Date: Mar. 24, 2021

(87) PCT Pub. No.: WO2020/067114
PCT Pub. Date: Apr. 2, 2020

(65) Prior Publication Data
US 2021/0396688 A1    Dec. 23, 2021

(30) Foreign Application Priority Data
Sep. 27, 2018    (JP) .................................. 2018-182813

(51) Int. Cl.
*G01N 23/05*    (2006.01)
*G01N 23/09*    (2018.01)
(Continued)

(52) U.S. Cl.
CPC .......... *G01N 23/204* (2013.01); *G01N 23/025* (2013.01); *G01N 23/05* (2013.01);
(Continued)

(58) Field of Classification Search
CPC ...... G01N 23/025; G01N 23/05; G01N 23/09; G01N 23/204; G01N 2223/106;
(Continued)

(56) References Cited

U.S. PATENT DOCUMENTS

| 4,093,854 A * | 6/1978 | Turcotte ................... G01V 5/12 |
| | | 250/269.2 |
| 5,037,602 A | 8/1991 | Dabiri et al. |

(Continued)

FOREIGN PATENT DOCUMENTS

| CN | 1886817 A | 12/2006 |
| CN | 104425200 A | 3/2015 |

(Continued)

OTHER PUBLICATIONS

Vladimir Kashikhin, Linear Accelerator Magnets, U. S. Particle Accelerator School, Jun. 22, 2017. (Year: 2017).*

(Continued)

*Primary Examiner* — Allen C. Ho
(74) *Attorney, Agent, or Firm* — Chiesa, Shahinian & Giantomasi PC

(57) ABSTRACT

A non-destructive inspection system 1 includes a neutron radiation source 3 capable of emitting neutrons N, and a neutron detector 14 capable of detecting neutrons Nb produced via an inspection object 6a among neutrons N emitted from the neutron radiation source 3. The neutron radiation source 3 includes a linear accelerator 11 capable of emitting charged particles P accelerated; a first magnet section 12 including magnets 12a and 12b facing each other, the magnets 12a and 12b being capable of deflecting the charged (Continued)

particles P in a direction substantially perpendicular to a direction of emission of the charged particles P from the linear accelerator 11; and a target section 13 capable of producing neutrons N by being irradiated with the charged particles P that have passed through the first magnet section 12.

10 Claims, 7 Drawing Sheets

(51) Int. Cl.
| | |
|---|---|
| G01N 23/204 | (2006.01) |
| G01V 5/00 | (2006.01) |
| G01N 23/20008 | (2018.01) |
| H05H 3/04 | (2006.01) |
| H05H 6/00 | (2006.01) |
| H05H 7/04 | (2006.01) |
| H05H 9/00 | (2006.01) |
| G01N 23/02 | (2006.01) |

(52) U.S. Cl.
CPC ....... *G01N 23/09* (2013.01); *G01N 23/20008* (2013.01); *G01V 5/0025* (2013.01); *G01V 5/0066* (2013.01); *H05H 3/04* (2013.01); *H05H 6/00* (2013.01); *H05H 7/04* (2013.01); *H05H 9/00* (2013.01); *G01N 2223/04* (2013.01); *G01N 2223/045* (2013.01); *G01N 2223/053* (2013.01); *G01N 2223/106* (2013.01); *G01N 2223/20* (2013.01); *G01N 2223/204* (2013.01); *G01N 2223/33* (2013.01)

(58) Field of Classification Search
CPC ............. G01N 23/203; G01N 2223/03; G01N 2223/04; G01N 2223/045; G01N 2223/053; G01N 2223/20; G01N 2223/204; G01V 5/0016; G01V 5/0025; G01V 5/0033; G01V 5/0066; G01V 5/02; G01V 5/10; G01V 5/107; G01V 5/108
USPC ............................ 250/269.4, 370.05, 390.01
See application file for complete search history.

(56) References Cited

U.S. PATENT DOCUMENTS

| | | | | | |
|---|---|---|---|---|---|
| 5,160,696 | A | * | 11/1992 | Bowman | G21F 9/30 376/195 |
| 5,557,108 | A | * | 9/1996 | Turner | G01N 23/204 250/391 |
| 5,684,299 | A | * | 11/1997 | DasGupta | G01V 5/14 250/269.4 |
| 5,757,009 | A | * | 5/1998 | Walstrom | G21K 1/093 250/398 |
| 5,870,447 | A | * | 2/1999 | Powell | G21G 1/10 376/190 |
| 5,930,314 | A | * | 7/1999 | Lanza | G01N 23/22 250/363.06 |
| 6,936,812 | B2 | * | 8/2005 | Odom | G01V 5/104 250/269.4 |
| 6,954,515 | B2 | * | 10/2005 | Bjorkholm | H01J 35/24 378/57 |
| 7,402,816 | B2 | * | 7/2008 | Renau | H01J 27/02 250/281 |
| 7,405,409 | B2 | * | 7/2008 | Kearfott | G01T 3/00 250/390.04 |
| 7,939,809 | B2 | * | 5/2011 | Balakin | A61N 5/10 315/504 |
| 8,129,699 | B2 | * | 3/2012 | Balakin | H05H 13/04 250/492.1 |
| 8,284,898 | B2 | * | 10/2012 | Ho | H05H 9/04 378/65 |
| 8,541,756 | B1 | * | 9/2013 | Treas | G01N 23/083 250/398 |
| 9,086,497 | B2 | * | 7/2015 | Bendahan | G01V 5/0016 |
| 9,218,933 | B2 | * | 12/2015 | Langeveld | H01J 37/3178 |
| 9,695,507 | B2 | * | 7/2017 | Fujii | C23C 14/14 |
| 9,984,851 | B2 | * | 5/2018 | Kariya | H01J 37/147 |
| 10,098,218 | B2 | * | 10/2018 | Yamamoto | H05H 7/001 |
| 10,241,061 | B2 | * | 3/2019 | Otake | G01T 3/06 |
| 10,462,893 | B2 | * | 10/2019 | Park, Jr. | G21G 4/02 |
| 10,714,225 | B2 | * | 7/2020 | Ylimaki | G21G 1/10 |
| 10,880,983 | B2 | * | 12/2020 | Bortfeld | G21K 5/04 |
| 11,024,437 | B2 | * | 6/2021 | Park, Jr. | H05H 6/00 |
| 11,513,084 | B2 | * | 11/2022 | Nagano | G01N 23/20008 |
| 11,614,415 | B2 | * | 3/2023 | Nagano | G01N 23/09 250/390.01 |
| 2005/0061997 | A1 | | 3/2005 | Benveniste | |
| 2006/0169912 | A1 | | 8/2006 | Renau et al. | |
| 2011/0180720 | A1 | | 7/2011 | Balakin | |
| 2015/0056366 | A1 | | 2/2015 | Kariya | |
| 2017/0223815 | A1 | | 8/2017 | Yamamoto et al. | |
| 2018/0259462 | A1 | | 9/2018 | Otake et al. | |

FOREIGN PATENT DOCUMENTS

| | | |
|---|---|---|
| CN | 105079982 A | 11/2015 |
| CN | 106717132 A | 5/2017 |
| CN | 109565923 A | 4/2019 |
| EP | 2946809 A1 | 11/2015 |
| JP | H04-95900 A | 3/1992 |
| JP | H4504174 A | 7/1992 |
| JP | H11297498 A | 10/1999 |
| JP | 2001-093700 A | 4/2001 |
| JP | 2007-507077 A | 3/2007 |
| JP | 2008521207 A | 6/2008 |
| JP | 2013150809 A | 8/2013 |
| JP | 2015-041440 A | 3/2015 |
| JP | 2015-217207 A | 12/2015 |
| JP | 2019-519071 A | 7/2019 |
| KR | 10-2006-0090672 A | 8/2006 |
| KR | 10-2015-0021884 A | 3/2015 |
| WO | 2005031787 A2 | 4/2005 |
| WO | 2016035151 A1 | 3/2016 |
| WO | 2017043581 A1 | 3/2017 |
| WO | 2017196659 A1 | 11/2017 |

OTHER PUBLICATIONS

Notice of Reasons for Refusal dated Jul. 26, 2022 in connection with Japanese Patent Application No. 2018-182813, 8 pgs. (including translation).

International Search Report and Written Opinion dated Dec. 17, 2019, in connection with International Patent Application No. PCT/JP2019/037500, 14 pgs. (including translation).

* cited by examiner

A-A

B-B

A-A

NON-DESTRUCTIVE INSPECTION SYSTEM COMPRISING NEUTRON RADIATION SOURCE AND NEUTRON RADIATION METHOD

CROSS-REFERENCE TO RELATED APPLICATIONS

This application is a national stage under 35 U.S.C. 371 of International Patent Application No. PCT/JP2019/037500, filed Sep. 25, 2019, which claims priority to Japanese Patent Application No. 2018-182813, filed Sep. 27, 2018, the disclosures of which are incorporated herein by reference in their entirety.

TECHNICAL FIELD

The present disclosure relates to a non-destructive inspection system for inspecting an inspection object using radiation, a neutron radiation source, and a neutron radiation method.

BACKGROUND ART

In recent years, it has been desired to appropriately maintain, repair, or renew aging infrastructures (hereinafter, referred to as infrastructure constructions) such as roads, bridges, tunnels, and building structures.

To inspect such an infrastructure construction, non-destructive inspection is performed using radiation, such as X-rays, penetrating an object. This non-destructive inspection allows an internal structure of an inspection object to be analyzed without destroying the inspection object.

In particular, in recent years, apparatuses for non-destructive inspection using neutrons, which are more penetrating than X-rays, have also been studied. For example, Patent Document 1 discloses a mechanism for non-destructively inspecting the inside of a bridge using neutrons generated by a portable neutron source mounted on a vehicle that is travelling on the bridge.

CITATION LIST

Patent Document

Patent Document 1: WO 2016/035151

SUMMARY OF THE INVENTION

Technical Problem

In this case, neutrons produced from a target by proton beam irradiation are scattered in various directions. Meanwhile, the yield of some of the neutrons traveling in the direction of a vector of kinetic energy of a proton beam incident on the target is high. Thus, to reduce the energy introduced into a linear accelerator and reduce the size of the system, it is recommended that the direction of incidence of the proton beam on the target and the direction of emission of the neutrons for use in inspection be aligned with each other. However, in the non-destructive inspection using neutrons in Patent Document 1, the direction of neutrons for use in inspection is orthogonal to the direction of incidence of the proton beam on the target. Since the linear accelerator and incidental facilities are large, it is difficult to move the linear accelerator to change the direction of incidence of the proton beam on the target. This results in difficulty in reducing the size of the system and efficiently emitting neutrons in an appropriate direction for the purpose of inspection.

In view of the foregoing background, an embodiment of the present invention has been made to solve such problems, and it is therefore an object of the prevent invention to provide a non-destructive inspection system, a neutron radiation source, and a neutron radiation method which are for use to non-destructively inspect an inspection object using neutrons and which function to deflect charged particles emitted from a linear accelerator during the non-destructive inspection to increase the yield of some, for use in inspection, of neutrons produced from a target and to increase the degree of freedom of the direction of inspection.

Solution to the Problem

To achieve the foregoing object, a non-destructive inspection system according to an embodiment of the present invention includes a neutron radiation source capable of emitting neutrons, and a neutron detector capable of detecting neutrons produced via an inspection object among neutrons emitted from the neutron radiation source. The neutron radiation source includes a linear accelerator capable of emitting charged particles accelerated; a first magnet section including magnets facing each other, the magnets being capable of deflecting the charged particles in a direction substantially perpendicular to a direction of emission of the charged particles from the linear accelerator; and a target section capable of producing neutrons by being irradiated with the charged particles that have passed through the first magnet section.

In the foregoing non-destructive inspection system, the linear accelerator may be capable of emitting a proton beam having a flat cross section, the proton beam being the charged particles, and a direction in which the magnets of the first magnet section face each other may correspond to a minor axis direction of the cross section of the proton beam emitted.

In the foregoing non-destructive inspection system, the magnets of the first magnet section may be electromagnets, and changing electric current energizing the electromagnets may trigger a change in a magnetic flux density between the magnets.

In the foregoing non-destructive inspection system, changing a distance between the magnets of the first magnet section facing each other may trigger a change in a magnetic flux density between the magnets.

In the foregoing non-destructive inspection system, the magnets of the first magnet section may be turnable around an axis being a direction of emission of the charged particles.

In the foregoing non-destructive inspection system, the neutron radiation source may further include a second magnet section, and the second magnet section may include magnets facing each other in a direction orthogonal to a direction in which the two magnets forming the first magnet section face each other.

In the foregoing non-destructive inspection system, the second magnet section may be capable of changing a magnetic flux density between the magnets of the second magnet section facing each other.

In the foregoing non-destructive inspection system, the neutron radiation source may be mounted on a mobile object, and a direction of emission of the charged particles from the linear accelerator may be substantially parallel to a direction of movement of the mobile object.

In the foregoing non-destructive inspection system, the neutron detector may be capable of detecting neutrons back-scattered inside the inspection object.

In the foregoing non-destructive inspection system, the neutron detector may be capable of detecting neutrons that have penetrated the inspection object.

The foregoing non-destructive inspection system may further include: an analyzer configured to analyze an inside of the inspection object based on information on the neutrons detected by the neutron detector.

To achieve the foregoing object, a neutron radiation source according to an embodiment of the present invention includes: a linear accelerator capable of emitting charged particles accelerated; a first magnet section including magnets facing each other, the magnets being capable of deflecting the charged particles in a direction substantially perpendicular to a direction of emission of the charged particles emitted from the linear accelerator; and a target section capable of producing neutrons by being irradiated with the charged particles that have passed through the first magnet section.

To achieve the foregoing object, a neutron radiation method according to an embodiment of the present invention includes: emitting charged particles accelerated through a linear accelerator; allowing a first magnet section including magnets facing each other to deflect the charged particles in a direction substantially perpendicular to a direction of emission of the charged particles from the linear accelerator; and allowing a target section to produce neutrons by being irradiated with the charged particles that have passed through the first magnet section.

Advantages of the Invention

According to an embodiment of the present invention using the foregoing means, in non-destructive inspection of an inspection object using neutrons, deflecting charged particles emitted from a linear accelerator can increase the yield of some, for use in inspection, of neutrons produced from a target, and can increase the degree of freedom of the direction of inspection.

DESCRIPTION OF EMBODIMENTS

Embodiments of the present invention will now be described with reference to the drawings.

First Embodiment

First, a first embodiment of the present invention will be described below.

Figure 1:
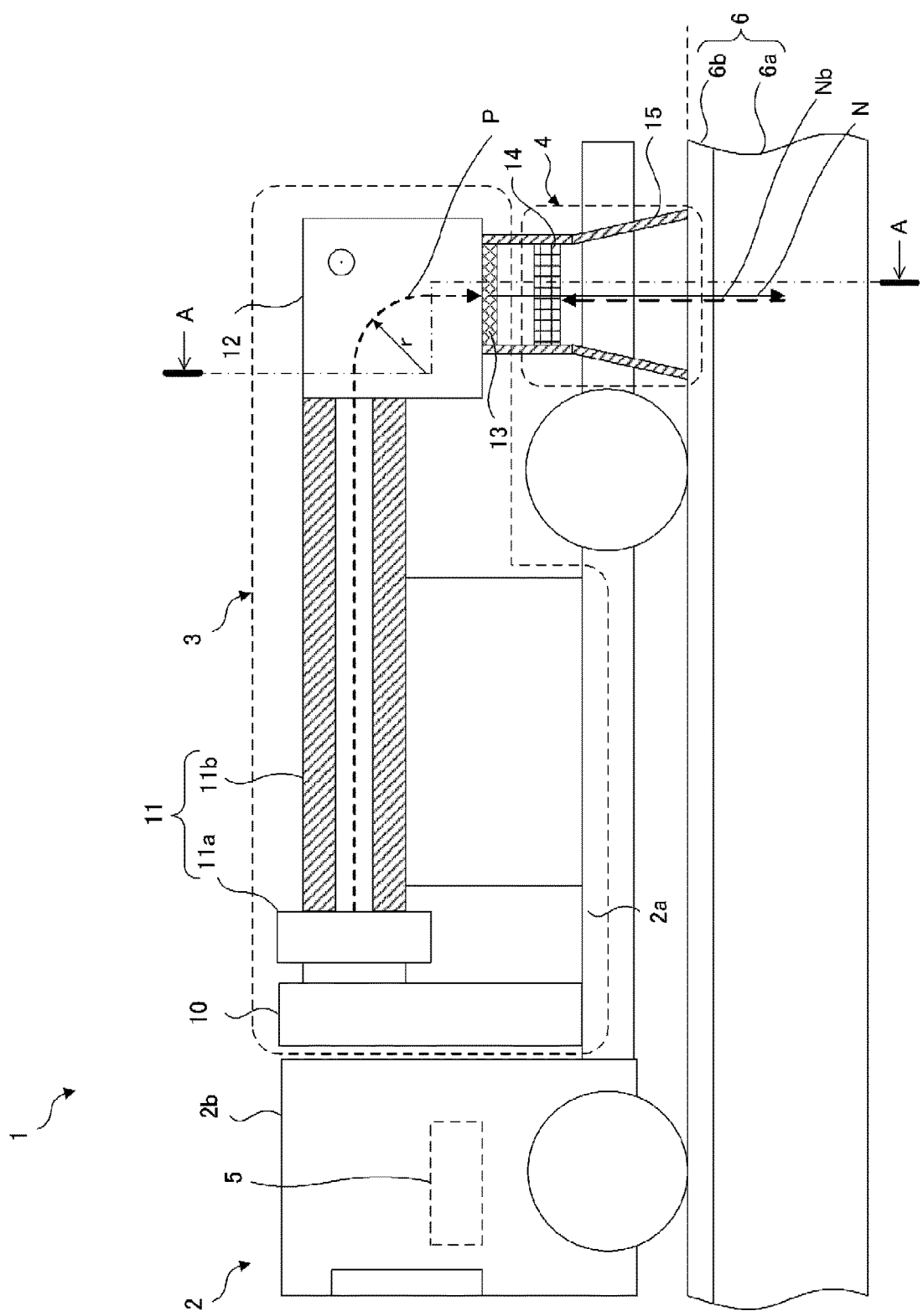
FIG. 1 illustrates a general configuration of a non-destructive inspection system according to a first embodiment of the present invention.
Figure 2:
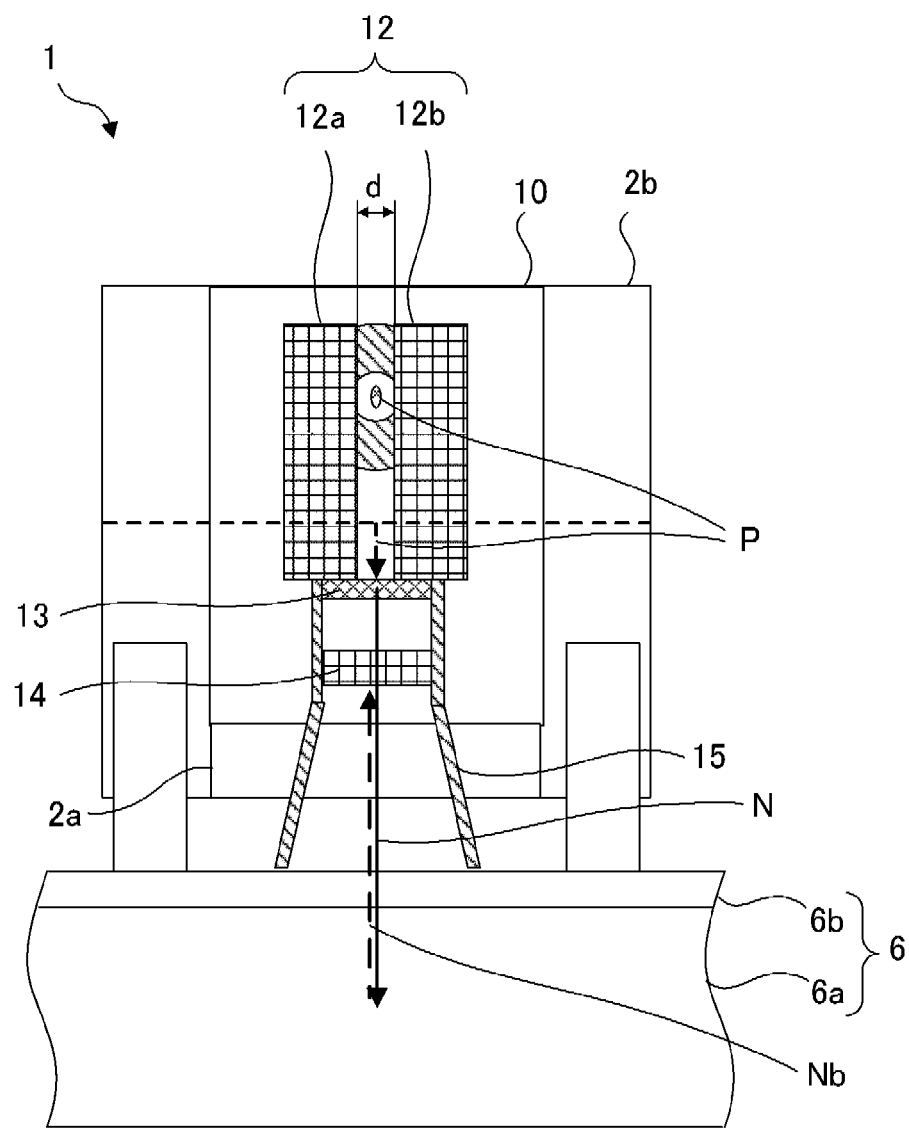
FIG. 2 is a cross-sectional view illustrating the non-destructive inspection system according to the first embodiment of the present invention and taken along line A-A in FIG. 1.

FIG. 1 illustrates a general configuration of a non-destructive inspection system 1 according to the first embodiment of the present invention. FIG. 2 is a cross-sectional of the non-destructive inspection system 1 taken along line A-A in FIG. 1. The configuration of the non-destructive inspection system 1 according to this embodiment will now be described with reference to these figures.

As illustrated in FIG. 1, the non-destructive inspection system 1 according to this embodiment includes a neutron radiation source system 3, a surveying system 4, and an analyzer 5 that are mounted on a vehicle 2, which is a mobile object. The vehicle 2 is, for example, a truck, which includes a platform 2a on which the neutron radiation source system 3 and the surveying system 4 are mounted, and a driver's seat 2b on which the analyzer 5 is mounted. In this embodiment, while the vehicle 2 travels on a bridge 6 that includes a concrete deck 6a having a surface paved with asphalt 6b, the concrete deck 6a that is the main inspection object is non-destructively inspected.

The neutron radiation source system 3 includes a power supply 10, a linear accelerator 11 emitting a proton beam P that is a charged particle beam, a magnet section 12, and a target section 13. The surveying system 4 includes a neutron detector 14 that is capable of detecting neutrons back-scattered inside the inspection object, and a shielding tube 15 for preventing neutrons from spreading to the outside.

Specifically, the power supply 10 is a generator that supplies electric power to units. In one preferred embodiment, the generator of the power supply 10 has a power generation performance to enable generation of at least protons that are charged particles, generates small voltage fluctuations, and is resistant to harmonic current. The power supply 10 may include a battery capable of storing electric power generated by the generator.

The linear accelerator 11 includes an ion source 11a that generates protons toward the rear of the vehicle 2, and an accelerator 11b in a cylindrical shape extends from the ion source 11a in the longitudinal direction of the vehicle 2, and is connected to the magnet section 12. The accelerator 11b accelerates the protons generated by the ion source 11a, and irradiates the magnet section 12 with the accelerated protons as a proton beam P.

The magnet section 12 (first magnet section) deflects, by magnetic force, the proton beam P emitted from the linear accelerator 11 in a direction substantially perpendicular to the direction of incidence of the proton beam P on the magnet section 12, and emits the deflected proton beam P. The magnet section 12 includes at least two magnets 12a and 12b facing each other, and has a magnetic field between these magnets facing each other. The magnets 12a and 12b are electromagnets. Controlling electric current flowing through these electromagnets allows a magnetic field with a predetermined magnetic flux density to be formed between these magnets. The magnets 12a and 12b may be permanent magnets as long as an adequately high magnetic flux density can be provided. In FIG. 1, the magnetic field is formed from the back toward the front of the plane of the paper (from the left toward the right of the vehicle in the lateral direction thereof).

The target section 13 is provided on a lower surface of the magnet section 12. The target section 13 collides with protons to produce neutrons N, and contains, for example, beryllium. The material of the shielding tube 15 shields neutrons N, and contains water, acryl, or polyethylene, for example. A lower portion of the target section 13 has an opening (not shown) through which some of the neutrons N which are produced from the target section 13 which travel in a predetermined direction are emitted to the outside. For example, the opening of the lower portion of the target section 13 of this embodiment allows neutrons N to be emitted downward of the vehicle 2 therethrough. In this embodiment, the opening is rectangular. However, this shape of the opening is merely an example, and is determined depending on the inspection object. The opening may be circular, for example. The opening may include a collimator limiting the direction of emission of the neutrons N. The collimator can increase the directivity of the neutrons N to be emitted. The path from the linear accelerator 11 to the target section 13 has a structure capable of maintaining high vacuum not to prevent the charged particles from flying.

The neutron detector 14 is formed in the shape of a rectangular plate, and is disposed below the target section 13. The neutron detector 14 of this embodiment detects back-scattered neutrons Nb that are some of the neutrons N which are produced from the target section 13 which are back-scattered in the deck 6a. In FIG. 1, the neutrons N emitted from the target section 13 are indicated by a solid arrow, and the back-scattered neutrons Nb are indicated by a dotted arrow.

The shielding tube 15 extends from the lower portion of the target section 13 through the platform 2a of the vehicle 2 to the surface of the bridge 6. The target section 13 and the neutron detector 14 are incorporated in the shielding tube 15, which prevents the neutrons N emitted from the target section 13 and the back-scattered neutrons Nb from leaking to the outside. The shielding tube 15 is made from a material that shields neutrons. In particular, a lower portion of the shielding tube 15 is flexible enough to absorb irregularities of the bridge surface to enhance the sealing performance in one preferred embodiment.

Next, the cross-sectional view of the non-destructive inspection system taken along line A-A shown in FIG. 1 will be described with reference to FIG. 2. The magnets 12a and 12b forming the magnet section 12 are arranged with a distance d therebetween. The cross section of the proton beam P emitted from the linear accelerator 11 has a flat shape having a minor axis in the lateral direction of the vehicle as can be seen from the cross section in FIG. 2. In this embodiment, the flat cross section of the emitted proton beam P has a minor axis length of about 2 mm and a major axis length of about 4 mm. As illustrated in FIG. 2, the magnets 12a and 12b are arranged such that the direction in which these magnets 12a and 12b face each other corresponds to the minor axis direction of the flat cross section of the emitted proton beam P. If these magnets have a constant magnetic force, shortening the distance between these magnets can increase the magnetic flux density between these magnets. Thus, if, as described above, the magnets 12a and 12b are arranged such that the direction in which the magnets 12a and 12b face each other corresponds to the minor axis direction of the flat cross section of the emitted proton beam P, the distance d between the magnets 12a and 12b can be made shorter to the extent that the proton beam P does not come into contact with the magnets than if the magnets 12a and 12b are arranged such that the direction in which the magnets 12a and 12b face each other corresponds to the major axis direction of the cross section of the emitted proton beam P. Thus, this configuration can increase the magnetic flux density between the magnets without increasing the magnetic forces of the magnets, and can increase the deflection curvature of the proton beam P (allows the proton beam P to be bent with a short curvature radius).

Next, a non-destructive inspection technique executed by the non-destructive inspection system 1 thus configured will be described.

When non-destructive inspection is to be performed, the vehicle 2 on which the non-destructive inspection system 1 is mounted is driven, and neutrons are emitted while the vehicle 2 is stopped or driven at the site of the inspection object, such as the bridge 6.

The ion source 11a of the linear accelerator 11 receives power supplied from the power supply 10, and generates protons. The accelerator 11b accelerates the protons generated by the ion source 11a, and irradiates the magnet section 12 with the accelerated protons as the proton beam P. The magnets 12a and 12b of the magnet section 12 receives power supplied from the power supply 10. As a result, the electromagnets are excited to produce a magnetic field. The proton beam P, which is the emitted charged particle beam, is deflected by the Lorentz force resulting from the magnetic field produced between the magnets.

The curvature radius of the proton beam P deflected by the magnet section 12 will now be described.

The Lorentz force allows charged particles having a mass m and a charge q and traveling at a velocity v to satisfy the relationship of the following mathematical equation 1 in a uniform magnetic field having a magnetic flux density B, where r represents the radius.

$$r = \frac{mv}{qB} \qquad \text{[Mathematical 1]}$$

The radius r (curvature radius) is determined to be 0.38 [m], based on the following mathematical equation 2, where if the proton beam P accelerated by the linear accelerator 11 and incident on the magnet section 12 has an energy of 7 [MeV], protons have a charge q of $1.6 \times 10^{19}$ [C] and a rest mass of 938 [MeV/c$^2$], the light velocity c is $3 \times 10^8$ [m/s], and the magnetic flux density between the magnets 12a and 12b is 1.0 [T].

$$r = \frac{\sqrt{2 \times 938 [\text{MeV}/c^2] \times 7.0 [\text{MeV}]}}{16 \times 10^{-19} [C] \times 1.0 [T]} = 0.38[m] \qquad \text{[Mathematical 2]}$$

As is apparent from the foregoing calculation, changing the magnetic flux density can trigger a change in the curvature radius. In other words, increasing the magnetic flux density can reduce the curvature radius. As indicated by the foregoing calculation, the magnet section 12 producing a magnetic field of the order of 1 [T] allows the proton beam P to be deflected with a curvature radius that allows the neutron radiation source system 3 to be mounted on the vehicle.

Next, the target section 13 is irradiated with the deflected proton beam P, which collides with an element, such as beryllium, forming the target section 13 to produce fast neutrons (hereinafter referred to as "neutrons"). Out of the neutrons spread from the target section 13, the neutrons N traveling downward are emitted through the opening toward the bridge 6 (a neutron radiation process). The target section 13 produces neutrons in all directions through the collision of the protons. The neutrons N emitted to the bridge 6 are neutrons generated in the same direction as the direction of the deflected proton beam P. This allows the neutrons N to be efficiently generated with respect to the energy introduced into the neutron radiation source system 3.

Some of the neutrons emitted to the bridge 6 penetrate the bridge 6 as they are, and travels downward of the bridge 6. The remaining neutrons are scattered inside the deck 6a, and are reflected as the back-scattered neutrons Nb. The back-scattered neutrons Nb are detected by the neutron detector 14 (a neutron detection process).

The analyzer 5 receives the detection result obtained by the neutron detector 14, i.e., information on the back-scattered neutrons Nb, and performs a predetermined computation using radiation transport calculation or any other process, thereby analyzing the internal structure of the deck 6a. This analysis allows the presence of voids formed or water present inside the deck 6a, for example, to be recognized.

The linear accelerator 11 needs to have a predetermined length to accelerate the proton beam P to a predetermined velocity. The width and height of a vehicle such as a truck that can travel on a general public road are limited. Thus, the linear accelerator 11 is disposed parallel to the longitudinal direction of the vehicle 2, which is the direction in which the vehicle 2 travels (moves). In this embodiment, the magnet section 12 can deflect the proton beam P emitted from the linear accelerator 11 in a downward direction perpendicular to the direction of emission of the proton beam P. In this case, the downward direction perpendicular to the direction of emission includes a range of about 45 degrees around the perpendicular direction. The foregoing configuration increases the yield of the neutrons N for use in inspection, out of the neutrons produced from the target section 13, while increasing the degree of freedom in determining the orientation of the linear accelerator 11 and the direction of the inspection. Thus, an efficient non-destructive inspection system can be provided.

In the non-destructive inspection system 1 according to this embodiment, the neutron detector 14 detects the back-scattered neutrons Nb, and can be disposed on the same side of the inspection object as the target section 13. This eliminates the need for providing the neutron detector beyond the inspection object. As a result, the neutron radiation source system 3 and the surveying system 4 can be installed in one vehicle. This can facilitate performing non-destructive inspection while moving.

The surveying system 4 does not always have to be integrated with the vehicle 2, and may be separate from the vehicle or may be attached to an arm or any other member extending from the vehicle. Using the neutron detector 14 that detects the neutrons N that have penetrated the inspection object allows the surveying system 4 to accurately analyze the internal structure of the inspection object based on the detected neutrons. This can provide advantages similar to those of the first embodiment.

The neutrons produced from the target section 13 should not be limited to fast neutrons, and may be thermal neutrons. The neutrons emitted through the opening may be thermal neutrons obtained by decelerating fast neutrons.

Next, a variation of the first embodiment of the present invention will be described below.

Figure 3:
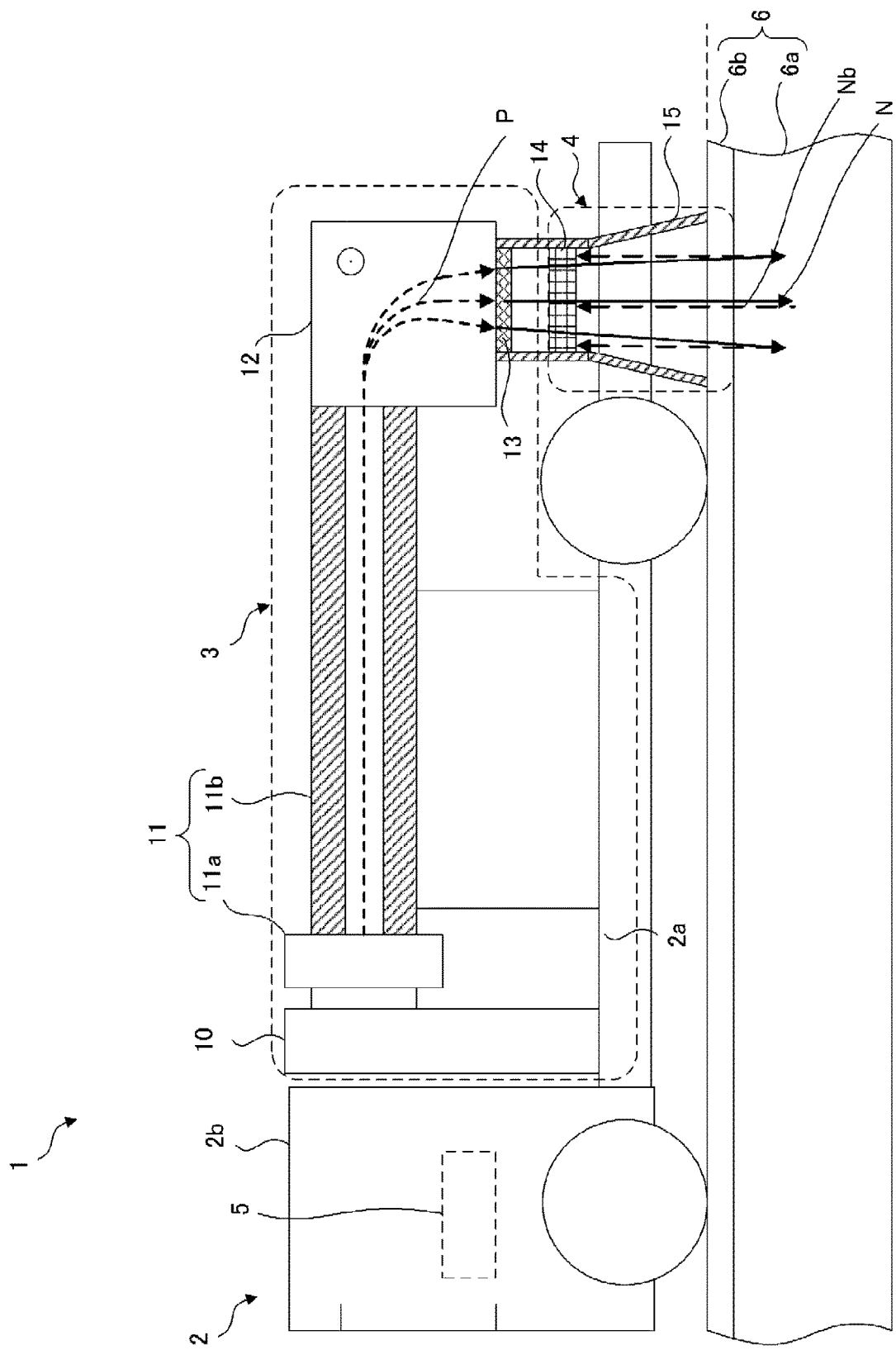
FIG. 3 illustrates a general configuration of a non-destructive inspection system according to a variation of the first embodiment of the present invention.

FIG. 3 illustrates a general configuration of a non-destructive inspection system 1 according to a variation of the first embodiment of the present invention. The magnet section 12 includes at least two magnets facing each other, and has a magnetic field between these magnets facing each other. The magnets are electromagnets. Changing electric current energizing these electromagnets can trigger a change in the magnetic flux density of a magnetic field between these magnets.

In the magnet section 12, as the magnetic flux density increases, the curvature radius of the proton beam P deflected decreases. Thus, the target section 13 is irradiated with the deflected proton beam P toward the left of the paper of FIG. 3 (toward the front of the vehicle). As the magnetic flux density decreases, the curvature radius of the proton beam P deflected increases. Thus, the target section 13 is irradiated with the deflected proton beam P toward the right of the paper of FIG. 3 (toward the rear of the vehicle). Changing the electric current flowing through the electromagnets as described above allows a different portion of the target section 13 to be irradiated with the proton beam P. As a result, the location from which the neutrons are emitted can be changed. The temperature of a portion of the target section 13 irradiated with the proton beam P increases. Thus, as in this embodiment, changing the portion of the target section 13 irradiated with the proton beam P can prevent a small spot of the target section 13 from being continuously irradiated with the proton beam P, and can prevent the target section 13 from being damaged by heat.

The magnets may be permanent magnets as long as an adequately high magnetic flux density can be provided. In FIG. 2, the magnets 12a and 12b forming the magnet section 12 are arranged with the distance d therebetween. Changing the distance d can trigger a change in the magnetic flux density between the magnets 12a and 12b. Specifically, shortening the distance d increases the magnetic flux density, and lengthening the distance d reduces the magnetic flux density. Thus, just like changing the electric current energizing the electromagnets as described above, changing the distance d allows a different portion of the target section 13 to be irradiated with the proton beam P. As a result, the location from which the neutrons are emitted can be changed. To achieve this, the magnet section 12 may include a mechanism for controlling the distance between the magnets 12a and 12b.

Second Embodiment

Next, a second embodiment of the present invention will be described below.

Figure 4:
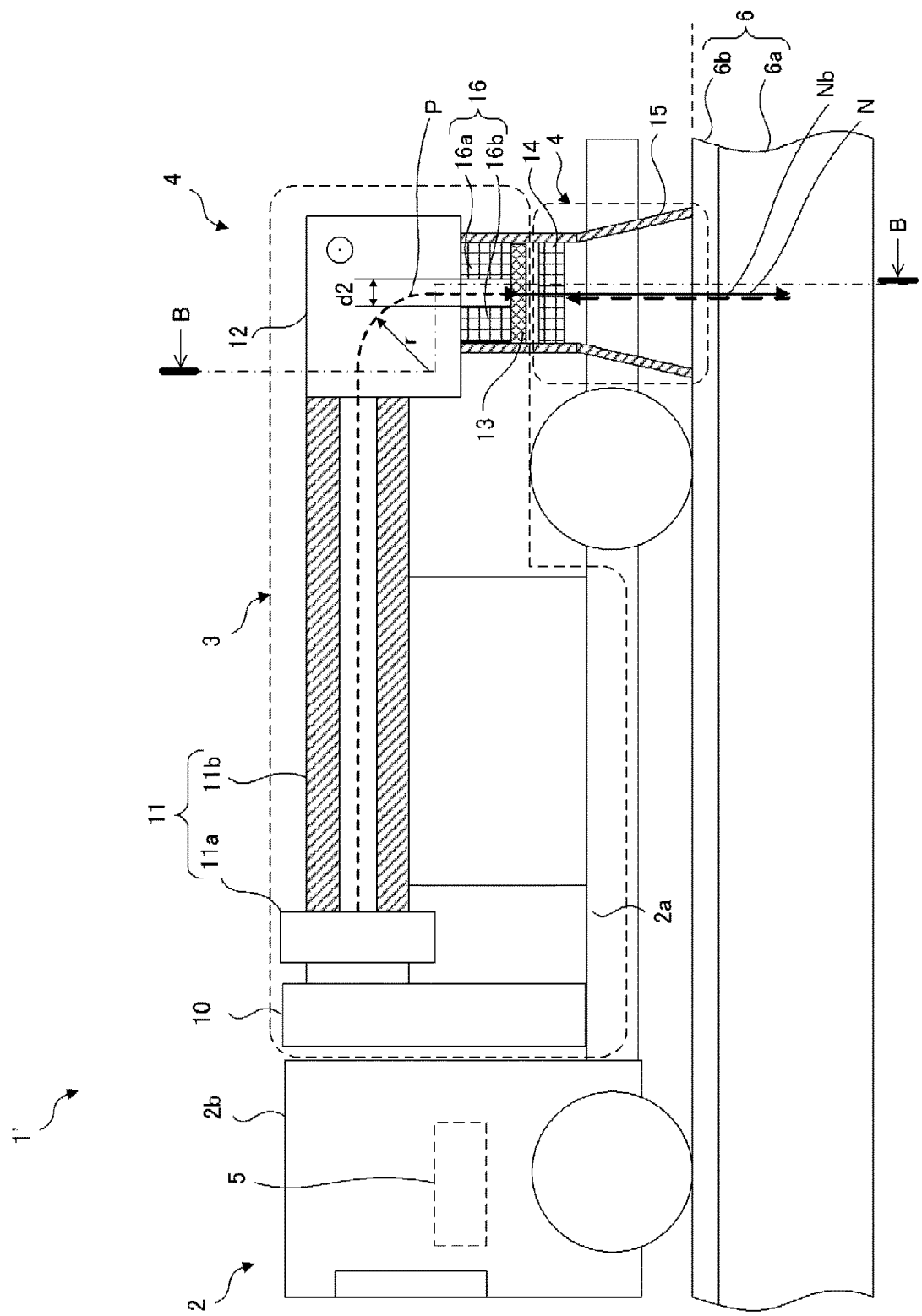
FIG. 4 illustrates a general configuration of a non-destructive inspection system according to a second embodiment of the present invention.
Figure 5:
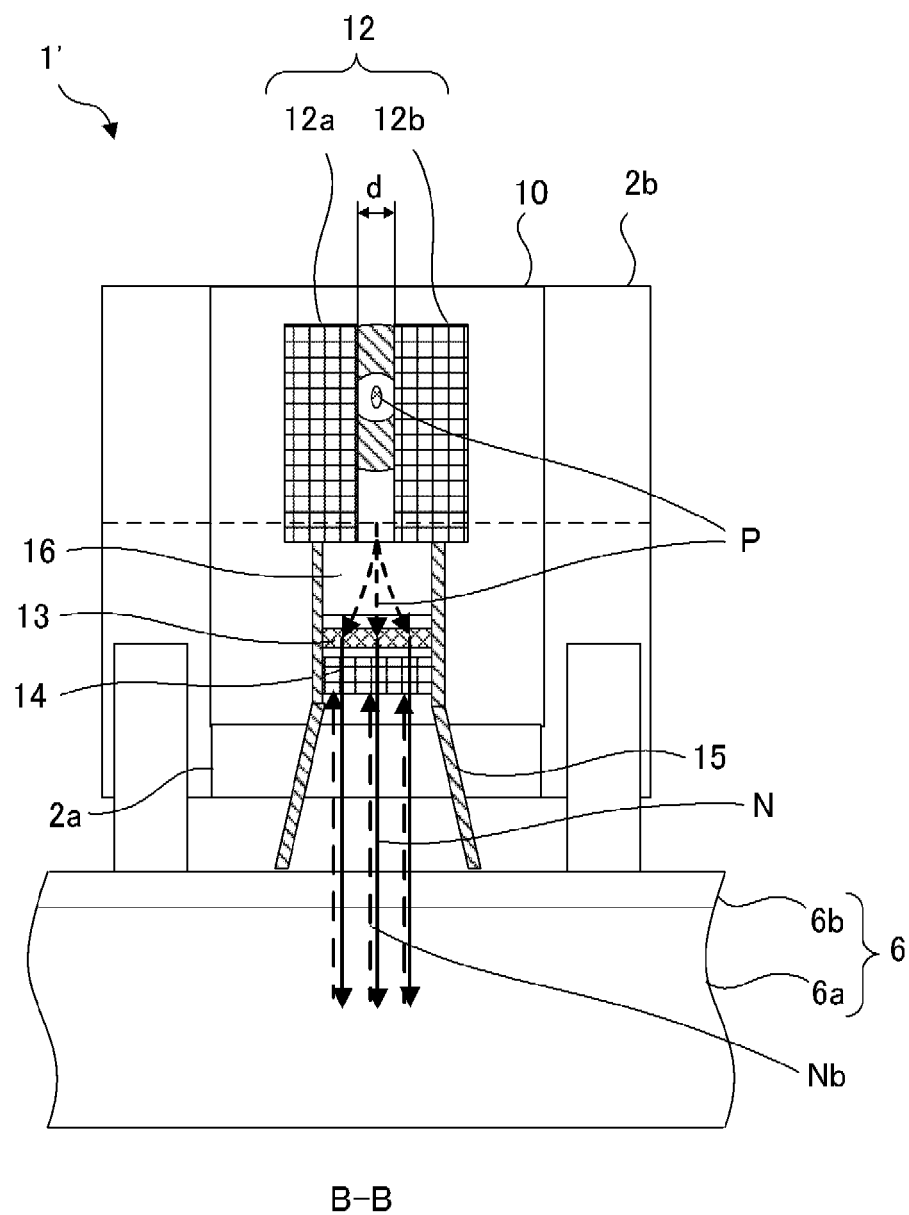
FIG. 5 is a cross-sectional view illustrating the non-destructive inspection system according to the second embodiment of the present invention and taken along line B-B in FIG. 4.

FIG. 4 illustrates a general configuration of a non-destructive inspection system 1' according to a second embodiment of the present invention. FIG. 5 is a cross-sectional view of the non-destructive inspection system 1' taken along line B-B in FIG. 4. The configuration of the non-destructive inspection system 1' according to the second embodiment will now be described with reference to these figures. The same reference characters are given to the same components as those of the first embodiment, and a description thereof is omitted.

The non-destructive inspection system 1' according to the second embodiment is basically the same as that of the first embodiment except that a second magnet section 16 is disposed below a magnet section 12 (referred to as a "first magnet section 12" in this embodiment). The second magnet section 16 according to the second embodiment further deflects a proton beam P deflected and emitted by the first magnet section 12. As illustrated in FIG. 4, the second magnet section 16 includes magnets 16a and 16b facing each other in a direction orthogonal to the direction in which two magnets 12a and 12b forming the first magnet section 12 face each other.

The two magnets 16a and 16b forming the second magnet section 16 are electromagnets. Changing electric current energizing these electromagnets can trigger a change in the magnetic flux density of a magnetic field between these magnets. In addition, changing the direction of the electric current for energization allows the direction of the magnetic field to be reversed.

In FIG. 5, if the magnetic field generated by the second magnet section 16 is zero, the proton beam P is emitted straight toward the lower side of the paper of FIG. 5 without being deflected by the second magnet section 16. If the magnetic field generated by the second magnet section 16 is formed from the front toward the back of the plane of the paper (from the rear toward the front of the vehicle), the proton beam P is deflected and emitted toward the right side of the paper (the right side of the vehicle) by the second magnet section 16. If the magnetic field generated by the second magnet section 16 is formed from the back toward the front of the plane of the paper (from the front toward the rear of the vehicle), the proton beam P is deflected and emitted toward the left side of the paper (the left side of the vehicle) by the second magnet section 16. Changing the amount and direction of the electric current flowing through the electromagnets as described above allows a different portion of the target section 13 to be irradiated with the proton beam P. As a result, the location from which the neutrons are emitted can be changed.

The magnets 16a and 16b of the second magnet section 16 may be permanent magnets as long as an adequately high magnetic flux density can be provided. In FIG. 4, the magnets 16a and 16b forming the second magnet section 16 are arranged with a distance d2 therebetween. Changing the distance d2 can trigger a change in the magnetic flux density between the magnets 16a and 16b of the second magnet section 16. Thus, changing the distance d2 allows a different portion of the target section 13 to be irradiated with the proton beam P. As a result, the location from which the neutrons are emitted can be changed. To achieve this, the second magnet section 16 may include a mechanism for controlling the distance between the magnets 16a and 16b.

Third Embodiment

Next, a third embodiment of the present invention will be described below.

Figure 6:
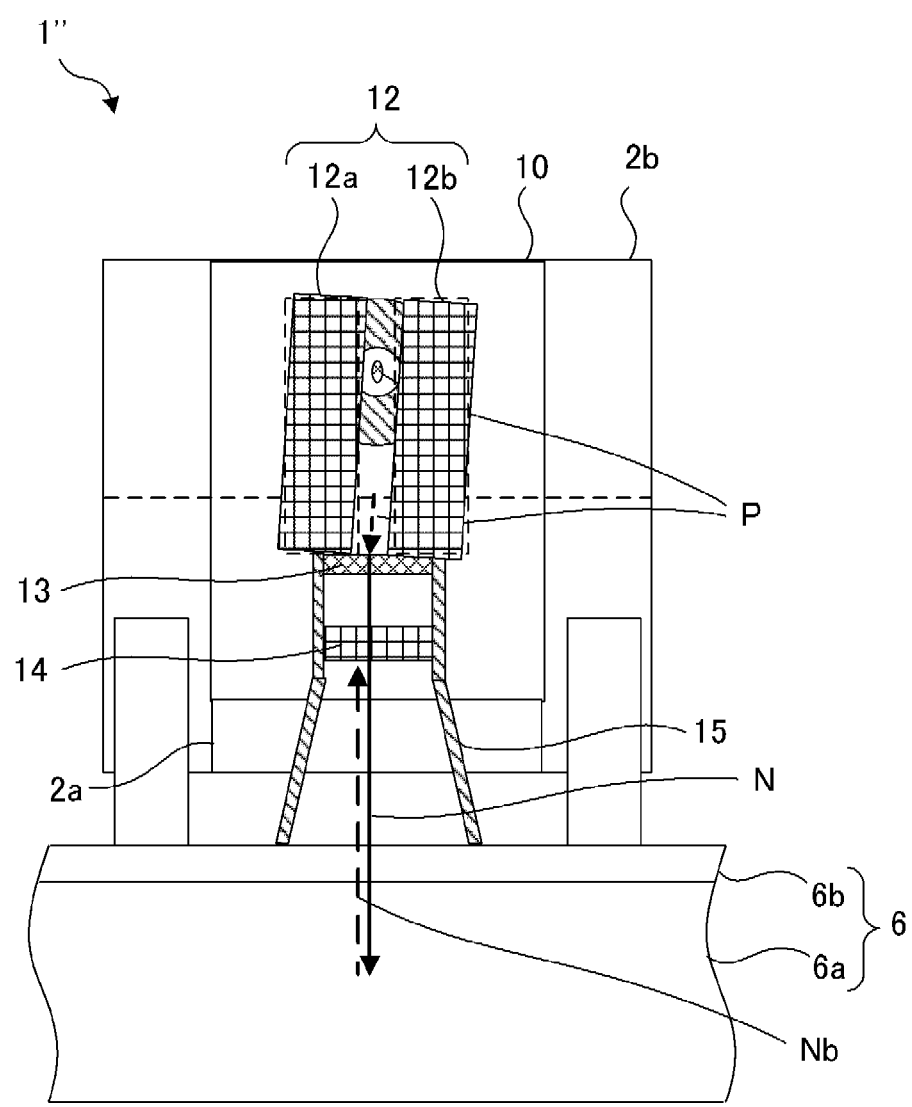
FIG. 6 illustrates a non-destructive inspection system according to a third embodiment of the present invention, and corresponds to the cross-sectional view taken along line A-A in FIG. 1.

FIG. 6 illustrates a general configuration of a non-destructive inspection system 1" according to a third embodiment of the present invention. The same reference characters are given to the same components as those of the first embodiment, and a description thereof is omitted.

The non-destructive inspection system 1" according to the third embodiment is basically the same as that of the first embodiment except that a magnet section 12 can turn around a predetermined axis. The magnet section 12 according to the third embodiment, shown in FIG. 6, can turn around the direction of emission of the proton beam P from the linear accelerator 11 as the central axis. Turning the magnet section 12 allows the proton beam P passing through the magnet section 12 to deflect to follow the direction in which the magnet section 12 turns. In other words, turning the magnet section 12 allows a different portion of the target section 13 to be irradiated with the proton beam P. As a result, the location from which the neutrons are emitted can be changed.

Fourth Embodiment

Next, a fourth embodiment of the present invention will be described below.

Figure 7:
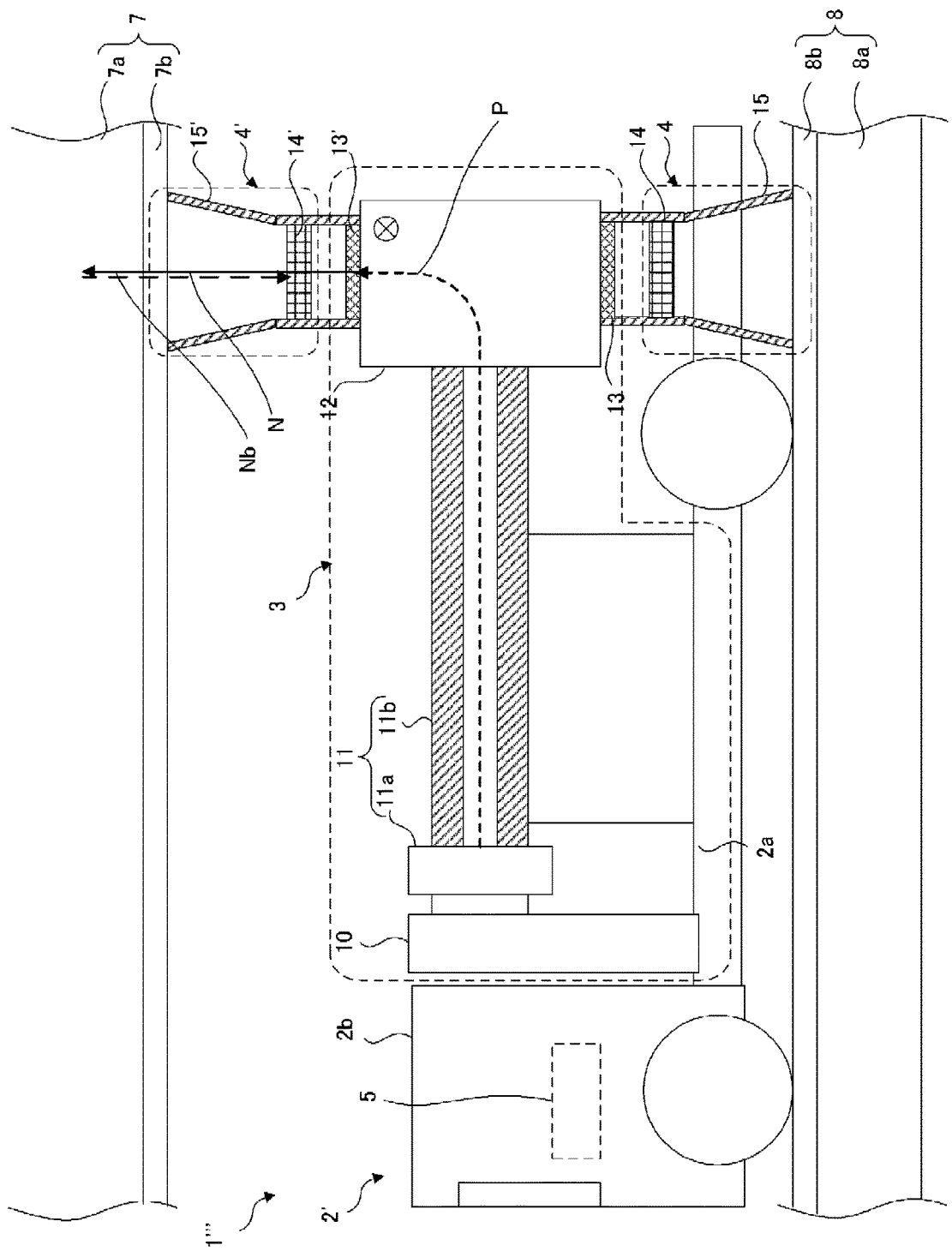
FIG. 7 illustrates a general configuration of a non-destructive inspection system according to a fourth embodiment of the present invention.

FIG. 7 illustrates a general configuration of a non-destructive inspection system 1''' according to a fourth embodiment of the present invention. The same reference characters are given to the same components as those of the first embodiment, and a description thereof is omitted.

The non-destructive inspection system 1''' according to the fourth embodiment is basically the same as that of the first embodiment except that a magnet section 12 is interposed between surveying systems 4 and between target sections 13 in a vertical direction. In this embodiment, while a vehicle 2' travels through a tunnel 7 that includes a tunnel structure 7a made from concrete and having a surface coated with a tunnel wall 7b, the tunnel structure 7a that is the main inspection object is non-destructively inspected. Alternatively, while the vehicle 2' travels on a road 8 that includes a road structure 8a made from concrete and having a surface paved with asphalt 8b, the road 8 that is the main inspection object may be non-destructively inspected.

Magnets forming the magnet section 12 are electromagnets. Changing electric current energizing these electromagnets can trigger a change in the magnetic flux density of a magnetic field between these magnets. In addition, changing the direction of the electric current for energization allows the direction of the magnetic field to be reversed.

In FIG. 7, the direction of the electric current for the magnet section 12 is controlled so that a magnetic field is formed from the front toward the back of the plane of the paper (from the right toward the left of the vehicle in the lateral direction thereof). Thus, a proton beam P deflects toward the upper side of the paper. The deflected proton beam P collides with a target section 13' to produce neutrons N.

A neutron detector 14' is formed in the shape of a rectangular plate, and is disposed above the target section 13'. The neutron detector 14' of this embodiment detects back-scattered neutrons Nb that are some of the neutrons which are produced from the target section 13' which are back-scattered in the tunnel structure 7a. In FIG. 7, the neutrons N emitted from the target section 13' are indicated by a solid arrow, and the back-scattered neutrons Nb are indicated by a dotted arrow.

Some of the neutrons emitted to the tunnel 7 penetrate the surface of the tunnel 7 as they are, and go into an inner portion of the tunnel 7. The remaining neutrons are scattered inside the tunnel structure 7a, and are reflected as the back-scattered neutrons Nb. The back-scattered neutrons Nb are detected by the neutron detector 14'.

The analyzer 5 receives the detection result obtained by the neutron detector 14', i.e., information on the back-scattered neutrons Nb, and performs a predetermined computation using radiation transport calculation or any other process, thereby analyzing the internal structure of the tunnel structure 7a. This analysis allows the presence of voids formed or water present inside the tunnel structure 7a, for example, to be recognized.

Next, if the vehicle 2' changes the position at which inspection is performed, and thus inspects the road 8, the direction of the electric current for the magnet section 12 is changed so that a magnetic field is formed from the back toward the front of the plane of the paper (from the left toward the right of the vehicle in the lateral direction thereof). Thus, a proton beam P deflects toward the lower side of the paper. The deflected proton beam P collides with the target section 13 to produce neutrons N. Just like the bridge of the first embodiment, the road 8 can be non-destructively inspected.

As described above, even in situations such as a situation where inspection objects, such as a tunnel and a road, are arranged at different vertical positions, changing the direction of the electric current for the magnet section 12 allows the non-destructive inspection system 1''' to address such a situation using the same vehicle 2'.

The embodiments of the present invention have been described hereinabove. However, the present invention is not limited to the embodiments described above.

The inspection object to be inspected by each of the non-destructive inspection systems 1 and 1' of the foregoing embodiments is the deck 6a of the bridge 6, the tunnel structure 7a of the tunnel 7, or the road structure 8a of the road 8. However, the inspection object is merely an example. The inspection object may also be, for example, a runway, or the floor or ceiling of a building structure.

The magnet section 12 of the non-destructive inspection system of each of the foregoing embodiments deflects the proton beam downward or upward of the vehicle. However, the direction of deflection is merely an example. For example, the proton beam may be deflected in the lateral direction of the vehicle. This enables non-destructive inspection of a standing inspection object, such as a bridge pier, a lateral surface of a tunnel, and a wall surface of a building structure.

DESCRIPTION OF REFERENCE CHARACTERS 1, 1', 1", 1''' Non-destructive Inspection System
2, 2' Vehicle
3 Neutron Radiation Source System
4, 4' Surveying System
5 Analyzer
6 Bridge
6a Deck (Inspection Object)
7 Tunnel
7a Tunnel Structure (Inspection Object)
8 Road
8a Road Structure (Inspection Object)
10 Power Supply
11 Linear Accelerator
12 Magnet Section (First Magnet Section)
12a, 12b Magnet
13, 13' Target Section
14, 14' Neutron Detector
15, 15' Shielding Tube
16, 16a, 16b Second Magnet Section
16a, 16b Magnet

The invention claimed is:

1. A non-destructive inspection system comprising:
a neutron radiation source capable of emitting neutrons; and
a neutron detector capable of detecting neutrons back-scattered inside an inspection object among neutrons emitted from the neutron radiation source,
the neutron radiation source including:
a linear accelerator capable of emitting accelerated charged particles;
a first magnet section including magnets facing each other, the magnets being capable of deflecting the accelerated charged particles in a direction substantially perpendicular to a direction of emission of the accelerated charged particles emitted from the linear accelerator; and
a target section capable of producing neutrons by being irradiated with the accelerated charged particles that have passed through the first magnet section.

2. The non-destructive inspection system of claim 1, wherein:
the linear accelerator is capable of emitting a proton beam having a flat cross section, the proton beam being the accelerated charged particles, and
a direction in which the magnets of the first magnet section face each other corresponds to a minor axis direction of the flat cross section of the emitted proton beam.

3. The non-destructive inspection system of claim 1, wherein:
the magnets of the first magnet section comprise electromagnets, and
the first magnet section is configured to change an electric current to energize the electromagnets to trigger a change in a magnetic flux density between the magnets.

4. The non-destructive inspection system of claim 1, wherein:
the first magnet section comprises a mechanism configured to control a distance between the magnets of the first magnet section facing each other to trigger a change in a magnetic flux density between the magnets.

5. The non-destructive inspection system of claim 1, wherein:
the magnets of the first magnet section are turnable around an axis being the direction of emission of the accelerated charged particles.

6. The non-destructive inspection system of claim 1, wherein:
the neutron radiation source further includes a second magnet section, and
the second magnet section includes magnets facing each other in a direction orthogonal to a direction in which the magnets of the first magnet section face each other.

7. The non-destructive inspection system of claim 6, wherein:
the second magnet section is capable of changing a magnetic flux density between the magnets of the second magnet section facing each other.

8. The non-destructive inspection system of claim 1, further comprising:
a vehicle, wherein:
the neutron radiation source is mounted on the vehicle, and
the direction of emission of the accelerated charged particles emitted from the linear accelerator is substantially parallel to a direction of a movement of the vehicle.

9. The non-destructive inspection system of claim 1, wherein:
the neutron detector is capable of detecting neutrons that have penetrated the inspection object.

10. A neutron radiation method comprising:
emitting accelerated charged particles through a linear accelerator;

allowing a first magnet section, including magnets facing each other, to deflect the accelerated charged particles in a direction substantially perpendicular to a direction of emission of the accelerated charged particles emitted from the linear accelerator;
allowing a target section to produce neutrons by being irradiated with the accelerated charged particles that have passed through the first magnet section; and
detecting neutrons back-scattered inside an inspection object among the produced neutrons.

* * * * *